US007627575B2

(12) United States Patent
Mellier et al.

(10) Patent No.: US 7,627,575 B2
(45) Date of Patent: Dec. 1, 2009

(54) METHOD FOR VALIDATING THE BROADCASTING CONDITIONS OF CONTENT FROM A THIRD PARTY

(75) Inventors: Pierre Mellier, Ecublens (CH); Gilles Rapin, Fresens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 686 days.

(21) Appl. No.: 10/518,306

(22) PCT Filed: Jun. 24, 2003

(86) PCT No.: PCT/IB03/02705

§ 371 (c)(1), (2), (4) Date: Jul. 12, 2005

(87) PCT Pub. No.: WO2004/004179

PCT Pub. Date: Jan. 8, 2004

(65) Prior Publication Data

US 2006/0023124 A1 Feb. 2, 2006

(51) Int. Cl.
*G06F 17/30* (2006.01)

(52) U.S. Cl. ............................ 707/9; 707/10; 707/101; 707/102; 707/103 Y; 707/104.1

(58) Field of Classification Search ..................... 707/3, 707/9, 10, 202, 101, 102, 103 Y, 104.1; 455/3.05; 709/227, 226; 713/201; 348/461; 725/46, 725/91
See application file for complete search history.

(56) References Cited

U.S. PATENT DOCUMENTS

| | | | | |
|---|---|---|---|---|
| 5,450,122 | A | 9/1995 | Keene | |
| 5,826,165 | A | 10/1998 | Echeita et al. | |
| 6,173,271 | B1 | 1/2001 | Goodman et al. | |
| 6,388,712 | B1 | 5/2002 | Shinohara et al. | |
| 6,597,891 | B2 * | 7/2003 | Tantawy et al. | 455/3.05 |
| 2002/0056004 | A1 * | 5/2002 | Smith et al. | 709/227 |
| 2002/0059624 | A1 * | 5/2002 | Machida et al. | 725/91 |
| 2002/0133477 | A1 * | 9/2002 | Abel | 707/1 |
| 2003/0037144 | A1 * | 2/2003 | Pestoni et al. | 709/226 |
| 2003/0067554 | A1 * | 4/2003 | Klarfeld et al. | 348/461 |
| 2003/0093792 | A1 * | 5/2003 | Labeeb et al. | 725/46 |
| 2003/0182579 | A1 * | 9/2003 | Leporini et al. | 713/201 |

OTHER PUBLICATIONS

Todd D. Hodes et al., "An architecture for secure wide-area service discovery", ACM, Apr. 2002, pp. 213-230.*
Hao-hua Chu et al., "A secure multicast protocol with copyright protection", ACM, Apr. 2002, pp. 42-60.*

* cited by examiner

*Primary Examiner*—Thuy N Pardo
(74) *Attorney, Agent, or Firm*—Harness, Dickey & Pierce, P.L.C.

(57) ABSTRACT

Example embodiments relate to a method for receiving contractual conditions from a supplier of digital content, in order to verify and validate the contractual conditions at a time of preparation for diffusion of the digital content by a diffuser. The method may include validating broadcasting conditions of the digital content by using a diffuser having a first data set describing a structural configuration, a second data set describing operational conditions of the diffuser, and a third data set describing conditions defined by the supplier.

6 Claims, 1 Drawing Sheet

METHOD FOR VALIDATING THE BROADCASTING CONDITIONS OF CONTENT FROM A THIRD PARTY

The present application concerns a method for surveillance and determination of specific conditions, in particular a method for verification of contractual conditions.

BACKGROUND

The diffusion of data content makes immediate reference to copyright. The supplier of this data wishes to ensure that the diffuser respects the conditions that have been established and duly accepted by both parties.

These conditions relate to very different domains. Among said conditions, there are the following:

diffusion hours and days
type of diffusion network (wired, satellite, Internet . . . )
type of data encryption
language
maximum and minimum number of diffusion
sector-based inhibition (blackout)
agreement period
promotional activity (announcements, advertising)
mode of payment (subscription, pay-per-view . . . )
copy protection (in/out)
type of reception device (STB, VPR, PDA, TV . . . )
persistence duration on the subscriber memory
authorized advertising cutting
sound track quality These are only a part of the conditions that are applied to an object. There are more global conditions that apply to an assembly of objects, for example, the guarantee of 10% of diffusion time to a supplier.

These criteria intervene at different points of the diffusion preparation process. As the moment of diffusion approaches, the configuration parameters become increasingly reliable and the number of verification increases.

Furthermore, a programmed diffusion is not forcedly carried out and thus the accounting of diffusion must also be taken into account. It is possible that this type of diffusion is either postponed or cancelled, or even only partially carried out, which can violate a clause of the agreement.

For this reason, in practice the diffusers have renounced to the systematic verification of all the contractual conditions and often unconsciously violate certain clauses. This certainly causes problems between the diffuser and the supplier of the digital content and can lead to the breaching of the contract, to penalties, or to the loss of the concession.

"Digital content" is understood to mean an information service concerning the stock exchange, weather, general television, films, sports events, a game or the like. This definition can also be applied to a group of products such as a TV channel or a series of products (continuous or retrospective). These content can be diffused on peripherals such as a Pay-TV decoder, a computer or even a mobile telephone, a "palm top", a PDA, a radio, a television or a multimedia terminal.

SUMMARY

The aim of the present invention is thus to propose a method and the means to receive contractual conditions from the supplier of the content in order to verify and validate said conditions at the time of the preparation of the diffusion of this content by a diffuser.

This aim is reached by a method for validating the broadcasting conditions of digital content, by means of a diffuser (D) having a first data unit (T3) describing the structural configuration, a second data unit (T2) describing the operational conditions of the diffuser (D) and a third data unit (T1) describing the conditions defined by the supplier (F), this method including the following steps:

reception of the conditions (T1) defined by the supplier for at least one digital content and storage of these conditions in a database of the diffuser (D), during the planning preparation of the digital content, introduction of the foreseen diffusion parameters of said digital content, said parameters comprising characteristics of the different material modules provided for diffusion, request to the database to extract the first, second and third data units, validation of the foreseen diffusion by verifying the second and third conditions with the foreseen diffusion parameters and the first data unit, and emitting a corresponding report (RP).

In its database, the diffuser will thus store conditional data for each digital content, this conditional data originating from the supplier as well as the data defining said content. This second part is used to connect this content to the operational conditions of the diffuser, for example, in terms of respect of the conditions of its concession.

An event such as, for example, a film, a sports broadcast, a series, news or a report is identified by a unique identifier. This identifier will be used as an entry key for the storage of the condition data defined by the diffuser and the data describing the content.

At the time of the preparation of the diffusion, the operator introduces the different parameters of the future diffusion such as, for example, the identifiers, the hour or the distribution channel.

This process is not carried out at one particular moment but can take place at several steps preceding diffusion. A month from diffusion, certain unknown parameters will not be taken into account. This could be the case with advertising before and after the event that will only be defined later.

Therefore, this verification process takes place at each step of the diffusion preparation. According to the proximity of the diffusion, the number of parameters increases and verification thus becomes increasingly important.

For the determination of the validity conditions for this type of the diffusion, the parameters contained in the database are insufficient. The invention system includes means to establish the material conditions of diffusion taken into account in the installed equipment. These means will read, for example, the encryption parameters or transmission quality.

Furthermore, the system includes means to establish the history of an event, for example, by relating the number of previous diffusions for this event or for a group of events. In fact, conditions reaching the maximum or minimum number of diffusions can take place in the verification. This data is stored in the database of diffusions.

The compilation of these parameters gives indications according to an importance level attached to each criterion.

According to one variant of the invention, the system includes three warning levels that correspond to the constraint level defined with each criterion:

prohibition of planning or diffusion (error),
message printing (warning),
inactive (without verification on criterion).

A report is thus emitted after these verifications, relating to said "pre-diffusion".

The invention's system is not only limited to the establishment of this report but also to the supervision of the effective diffusions. In fact, there may be different reasons for which a programmed diffusion is not executed.

Therefore, it is important that the data concerning the previous diffusions is collected on the basis of the real diffusions. The invention system collects all the diffused events with the particular conditions for each diffusion in order to store this data in its diffusion database.

It is thus possible to generate said "post-diffusion" report. This report is based on the real parameters of the diffusion and no longer on simulations. This report also indicates which constraint had not been respected.

Figure 1:
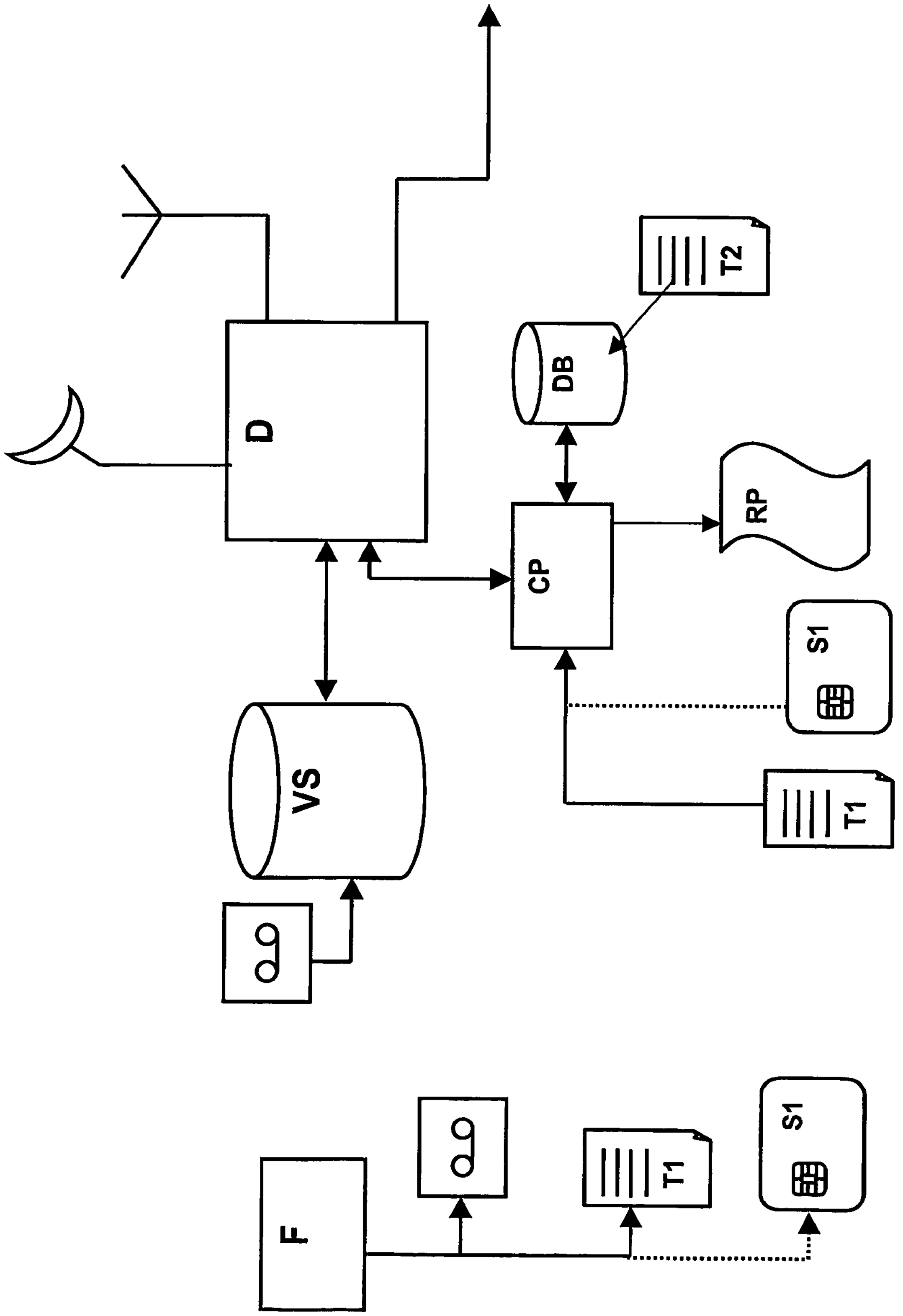
FIG. 1 is a flowchart illustrating a method for validating broadcasting conditions of digital content in accordance to an example embodiment of the present invention.

The invention will be better understood thanks to the following detailed description that refers to the enclosed Figure which is given as a non-limitative example, and which shows the assembly of elements intervening in the processing of the diffusion conditions.

DETAILED DESCRIPTION OF EMBODIMENTS

In FIG. 1, on the left part is the supplier F of digital data. This data is generally provided in the form of a large capacity media. The supplier F determines the conditions T1 that are initially written on paper.

These data and conditions are transmitted to the diffuser D. The data is stored on a video server VS which contains a large number of digital content ready for diffusion. The contract T1, in particular the elements obtained from the electronic verification, is seized in the processing centre CP. This data is then stored in its database DB. On this basis, the general diffusion conditions T2 pertaining to the diffuser are to be found. These conditions T2 generally follow from the concession that links the diffuser with a verification organism.

At the time of the validation of a given event, the processing centre CP will thus determine the conditions of this diffusion. For this, the centre has several data sources:

- the parameters introduced manually by the operator to define, for example, the hour of this diffusion and the foreseen channel,
- the system parameters of the diffuser stored in a memory and containing the physical descriptions of its configuration,
- the parameters collected directly on the diffuser equipment and depending, for example, on the used channel,
- the historical parameters of previous diffusions.

As can be seen in the above example, the parameters operating in this verification are by nature very different.

Once processed, the processing centre can thus visualize a report indicating if the diffusion enters into the contractual frame. It is possible that certain conditions cannot be automatically controlled and are thus recalled to the operator.

The verification criteria are filed according to a degree of importance. The report given to the operator will comprise warnings if any of the criteria are not fulfilled, or will comprise error messages when an important criterion is not respected.

The method according to the invention takes also place during diffusion for the collection of broadcasted events. The system records the broadcasted events with the diffusion conditions. It is thus possible to generate a report RP informing the operator of the real diffusion situation in relation to the defined conditions. This step is important due to the fact that during preparation, certain parameters that make the historical parameters intervene are used. This surveillance stage is used to collect statistical data regarding the previous diffusions. It also serves to account for the effective diffusions from the supplier.

The first aim of this method is not to block the diffusion if one of the criteria is not respected, but to signal this situation to the operator as soon as possible, during the preparation of the diffusion.

In another variant of the invention, it is possible to restrict the verification conditions.

In this latter version, provision is made to carry out the acquisition of the first conditions T1 directly by means of the supplier F. These conditions are stored in any medium, represented here by a smart card S1. It is possible to store these conditions on a diskette and secure the assembly by means of an enciphering key.

This medium is then transmitted to the diffuser D which loads said medium into its verification programme. It should be noted that the manipulations on these first conditions T1 are limited. It is not, for example, possible to change the date from which diffusion is authorized.

At the time of the generation of the diffusion report RP as previously described, the part concerning an event can be reported on the medium S1 that served to load the first conditions. It can also be loaded on a different medium, or even transmitted electronically. The diffusion data collected for an event is signed by a key pertaining to the supplier F (public key for example).

The invention claimed is:

1. A method for validating broadcasting conditions of digital content, by using a diffuser having a first set of data describing a structural configuration of a broadcast, a second set of data describing operational conditions of the diffuser, and a third set of data describing conditions defined by a supplier of the digital content including operational conditions and structural conditions, the method comprising:

- receiving the third set of data defined by the supplier for at least one digital content and storing the third set of data in a database of the diffuser,
- preparing a broadcast of the at least one digital content without any interaction with a terminal executed by the diffuser by establishing:
  - the structural configurations of the broadcast by introducing characteristics of different equipments intended for broadcasting in order to set the first set of data, and
  - the operational conditions of the broadcast by introducing at least the time and date of the broadcast in order to set the second set of data,
- extracting, from the database, the third set of data related to the digital content,
- verifying, for the digital content based on the third set of data, the broadcast conditions as set forth in the first set of data and the second set of data, and
- emitting a corresponding report on the verification step.

2. The method according to claim 1, further comprising a surveillance step of an effective diffusion time and date, and a structural configuration of the diffuser.

3. The method according to claim 2, further comprising a verification step of a diffusion of a digital content on the basis of effective diffusion parameters.

4. The method according to claim 1, further comprising inputting an storing the third set of data by the supplier on a secured medium, and transmitting the medium to the diffuser to be electronically transferred into a database of the diffuser.

5. The method according to claim 4, further comprising storing report electronically, and transmitting the report to the supplier.

6. The method according to claim 5, wherein the diffuser has an electronic signature, and further comprising signing the report with the electronic signature.

* * * * *